(12) United States Patent
Easley

(10) Patent No.: US 6,813,494 B2
(45) Date of Patent: *Nov. 2, 2004

(54) METHODS AND SYSTEMS FOR IMPLEMENTATION OF THE CALLING NAME DELIVERY SERVICE THROUGH USE OF A LOCATION REGISTER IN A NETWORK ELEMENT IN A WIRELESS NETWORK

(75) Inventor: Larry Scott Easley, Lawrenceville, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/347,832

(22) Filed: Jan. 21, 2003

(65) Prior Publication Data

US 2003/0104812 A1 Jun. 5, 2003

Related U.S. Application Data

(63) Continuation of application No. 09/378,904, filed on Aug. 23, 1999.

(51) Int. Cl.[7] .............................................. H04Q 7/20
(52) U.S. Cl. .................. 455/433; 455/426.1; 455/435.1
(58) Field of Search ............................. 455/433, 435.1, 455/415, 414.1, 445, 426.1

(56) References Cited

U.S. PATENT DOCUMENTS

| | | | |
|---|---|---|---|
| 4,680,785 A | 7/1987 | Akiyama et al. | ............. 379/57 |
| 5,502,759 A | 3/1996 | Cheng et al. | |
| 5,511,111 A | 4/1996 | Serbetcioglu et al. | ......... 379/67 |
| 5,533,096 A | 7/1996 | Bales | ......................... 379/58 |
| 5,566,235 A | 10/1996 | Hetz | |
| 5,579,375 A | 11/1996 | Ginter | ......................... 379/59 |
| 5,625,681 A | 4/1997 | Butler, II | |

(List continued on next page.)

FOREIGN PATENT DOCUMENTS

| | | |
|---|---|---|
| EP | 0926910 A | 6/1999 |
| WO | WO 98 49845 | 5/1998 |
| WO | PCT/US98/18367 | 9/1998 |

OTHER PUBLICATIONS

"T1.112–Issue 4 (WD)", Bell Communications Research.
"6.4.2.27 Location Request" WIN TIA/EIA–41.5–5 Modifications, Bell Communications Research.
"3.2.1 Scenario Diagram Conventions" WIN TIA/EIA–41.1–D Modifications, Jan. 19, 1999, Bell Communications Research.

(List continued on next page.)

Primary Examiner—Tony T. Nguyen
(74) Attorney, Agent, or Firm—Cantor Colburn LLP

(57) ABSTRACT

Methods and systems for providing for calling party name and/or other information corresponding to a wireless unit to be stored in association with the mobile identity number (MIN) and/or mobile directory number (MDN) of the wireless unit in a location register such as the home location register (HLR) in a network element of a wireless network. The network element is configured to accept and support the TR-1188, wireless intelligent network (WIN), or the like messaging processes. When a calling party uses a wireless unit to make a call to a wireline unit of a subscriber having calling name delivery service, the call is routed in a conventional manner to the service switching point (SSP) serving the calling line of the wireline unit. Based on the called party's status as a subscriber, the SSP uses the appropriate messaging process in a query/response exchange to obtain the calling party name and/or other information from the appropriate network element that includes the calling name (or other information) in or has access to an appropriate location register. The SSP then may provide the calling party name and/or other information for display on the wireline unit or associated display device.

9 Claims, 2 Drawing Sheets

U.S. PATENT DOCUMENTS

| | | | |
|---|---|---|---|
| 5,661,792 A | 8/1997 | Akinpelu et al. | |
| 5,745,852 A | 4/1998 | Khan et al. | 455/433 |
| 5,771,283 A | 6/1998 | Chang et al. | |
| 5,796,806 A | 8/1998 | Birckbichler | 379/67 |
| 5,815,810 A | 9/1998 | Gallant et al. | 455/433 |
| 5,845,211 A | 12/1998 | Roach, Jr. | |
| 5,854,836 A | 12/1998 | Nimmagadda | |
| 5,892,821 A | 4/1999 | Turner | |
| 5,903,636 A | 5/1999 | Malik | 379/142 |
| 5,949,867 A | 9/1999 | Sonnenberg | |
| 6,028,921 A | 2/2000 | Malik et al. | 379/201 |
| 6,115,599 A | 9/2000 | Stilp | 455/404 |

OTHER PUBLICATIONS

BellSouth Telecommunications, AIN IBU—Network, (Mar. 1994). A Technical Overview of BellSouth Telecommunications' Advanced Intelligent Network.

Alcatel IN Division, (Aug. 12, 1998). Data Sheet: Calling Name Presentation and Restriction, Revision 0.1.

Alcatel USA Inc. (Dec. 8, 1998). Calling Name Delivery (CNAM), Revision 0.2.

Compaq (Mar. 9, 1999). Calling Name Presentation (CNAP) Application: Feature Description, Version 1.1.

Bellcore, Bell Communications Research (Dec. 1991). CLASS Feature: Calling Name Delivery Generic Requirements.

Powers, R., et al. "Calling Name Delivery," *Annual Review of Communications*, vol. 46, Jan. 1, 1992 pp–633–635.

Chen, J.C., Open AIN Operations Strategies, *"Proceedings of the Network Operations and Management Symposium"*, (NOM, Kissimmee, Feb. 14–17, 1994, vol. 1, No. SYMP. 4, Feb. 14, 1994, pp. 140–152.

"Alternative Methods for Introducing New Wireless Intelligent Network Services Using Triggers and Queries", Hlavacek D.M. et al., Bell Labs Technical Journal, Jun. 21, 1997.

"Calling Name Delivery", Powers R. et al., Annual Review of Communications, 1992.

METHODS AND SYSTEMS FOR IMPLEMENTATION OF THE CALLING NAME DELIVERY SERVICE THROUGH USE OF A LOCATION REGISTER IN A NETWORK ELEMENT IN A WIRELESS NETWORK

The present application is a continuation of U.S. Application Ser. No. 09/378,904 entitled "Methods and Systems for Implementation of the Calling Name Delivery Service Through Use of a Location Register in a Network Element in a Wireless Network filed Aug. 23, 1999.

FIELD OF THE INVENTIONS

The present inventions relate to communications, and particularly, relate to the provision of a calling name and/or other information relating to a wireless unit used to make a call to a called party using a wireline unit and having a calling name delivery service.

BACKGROUND

The communications service known as calling name delivery or identification is popular with customers. Calling name delivery also may be referred to as calling name presentation (CNAP). A calling name delivery service provides identification of the calling party (e.g., personal name, company name, "restricted", "unavailable", etc.) and/or other information to the called party. In particular, a customer who subscribes to a calling name delivery service typically has a telecommunications unit or device that allows for the real-time display of a calling party name and/or other information associated with a received call. A calling name delivery service also may be referred to as an information delivery service, especially when the delivery service delivers information in addition to or other than a calling name.

The calling name delivery service generally provides calling name (and/or other information) for calls between wireline (also referred to as a landline) units. For example, assume Scott and Laura each have a wireline unit (such as a telephone) in their respective homes. Scott uses his home telephone to call Laura at home. Laura subscribes to a calling name delivery service, and thus, Scott's name appears on the display of Laura's home telephone when he calls Laura.

Unfortunately, the above-described process of calling name delivery is not applicable to a call from a wireless unit such as a cell phone or other mobile phone to a wireline unit. For example, assume Scott uses his car phone to call Laura at home. As noted, Laura subscribes to the calling name delivery service. But the communications system is unable to delivery Scott's name or other information associated with the received call to Laura's home telephone.

The principal reason the communications system is unable to delivery Scott's name when he is using his car phone is that there is no calling name database or other source available to provide Scott's name associated with his cell phone for display on Laura's home telephone. In contrast, in the wireline example, a calling name database typically stores information associated with each calling line served in a region. But a wireless unit is not associated with a calling line in the physical sense that a wireline unit is associated with a calling line. Thus, information related to a wireless unit is not typically stored in a calling name database that includes information related to calling lines served in a general region. Scott's call from his car phone results in a display on Laura's home telephone that may read: "Information unavailable" or "out of area".

A subscriber to a calling name delivery service generally is not pleased to repeatedly receive the "information unavailable" or "out of area" notice on his or her display in association with a call. The subscriber may believe that he or she is not getting his or her money's worth in terms of the fees he or she pays for the calling name delivery service. Further, a subscriber to a calling name delivery service becomes accustomed to viewing the display of calling party information and feels frustrated when such information is not forthcoming.

Unfortunately, previous attempts to incorporate wireless units in a calling name delivery service have not proved entirely successful. As noted above, calling name information associated with a wireless unit is not generally incorporated in a calling name database used to find name or other information associated with a wireline unit. A calling name database includes entries that may be indexed based on the calling line on which a call originates. A wireless unit is not associated with a calling line. Thus, the characteristics of a wireless unit do not fit the entry format in a typical calling line database serving wireline units.

A separate database for wireless units has been suggested. For example, the wireless database may be set up to include entries so as to provide calling name and/or other information associated with a wireless unit whose owner is based within a "home" region. But, unlike a wireline unit, a wireless unit is mobile and may operate outside its home region in a visited region. A wireless unit operating in a visited region is said to be "roaming". If the user of the wireless unit makes a call while roaming, the calling name delivery service may be unable to find any information about the roaming unit. The service again displays the "information unavailable" or "out of area" notice to the subscriber.

Moreover, given the nature of wireless units, the distribution and use of wireless units is generally more dynamic than that of wireline units. A customer may have the same wireline number (also referred to as a directory number or a telephone number) for years. But the same customer or household may have more than one wireless unit. A customer may lose or have his or her wireless unit stolen. A customer may buy new wireless units and discard the old ones as technology improves. A customer may switch relatively frequently upon contract expiration or for other reasons among wireless service providers and each time garner a new or different wireless unit.

This dynamic distribution and use of wireless units makes it difficult to keep track of wireless units. For example, assume a wireless database is set up to include entries so as to provide calling name and/or other information associated with a wireless unit. Also assume the problems associated with a roaming unit in the delivery of calling name service are solved or at least minimized. Entries in the wireless database need to be routinely and repeatedly updated so as to provide correct information in the calling name delivery service. With the dynamic distribution and use of wireless units, keeping up with the many changes to the entries in a wireless database is not an insignificant task. This task is complicated by the need to keep the calling name and/or other information regarding a wireless unit in the wireless calling name database in synchronicity with the information regarding the wireless unit in a home location register (HLR) of a mobile switching center (MSC) or other wireless network element. This synchronicity may be difficult to achieve and result in discrepancies between the wireless calling name database and the HLR.

Another previous attempt to incorporate wireless units in a calling name delivery service is described in the patent to Serbetcioglu et al., U.S. Pat. No. 5,511,111, entitled "Caller Name and Identification Communication System with Caller Screening Option." Serbetcioglu et al. adds a feature server to an existing network. The network feature server intercepts an incoming call for a called subscriber and prompts the caller to either speak his or her name, or speak or punch a pin number. The called subscriber then is played the caller's spoken name or is provided with information that is associated with the pin number entered by the caller.

There are drawbacks to the use of Serbetcioglu et al.'s feature server. A drawback is that Serbetcioglu et al. requires that another element (the feature server) be added to the telecommunications network. In addition, in Serbetcioglu et al., calls must be routed for interception by the feature server. Thus, Serbetcioglu et al. requires re-routing of current patterns. Yet another drawback is that Serbetcioglu et al. generally does not provide information for all callers for display such as generally provided by calling name delivery services. Only those callers who have been previously entered by the called subscriber into the feature server may have their names displayed. Other "unknown" callers are requested to speak their names, and the caller's spoken name is delivered to the called subscriber. The delivery of a spoken name generally requires the called subscriber to listen on his or her handset or otherwise get more involved with the call than by simply glancing at the display unit for the name of the calling party.

Accordingly, there is a need for methods and systems that provide a calling party name and/or other information corresponding to a wireless unit where the wireless unit used to make a call to the wireline unit of a subscriber having a calling name delivery service.

SUMMARY

Generally stated, the present inventions relate to methods and systems for providing for calling party name and/or other information associated with a wireless unit to be delivered to a wireline unit as part of a calling name delivery service. To implement such service, the methods and systems provide for calling party name and/or other information associated with a wireless unit to be associated with the mobile identity number (MIN) and/or mobile directory number (MDN) of the wireless unit in a location register (LR) such as the home location register (HLR) in a network element of a wireless network. The network element is configured to accept and support the TR-1188, wireless intelligent network (WIN), or the like messaging processes.

Advantageously, the calling party name and/or other information for a particular wireless unit may be provisioned into or updated at the same time the MIN and/or MDN of the wireless unit is set up or updated in the LR. Another advantage is that a separate calling name database for wireless units is not required and the problems associated with such a separate calling name database are obviated.

When a calling party uses a wireless unit to make a call to a wireline unit of a subscriber having calling name delivery service, the call is routed in a conventional manner to the service switching point (SSP) serving the calling line of the wireline unit. Based on the called party's status as a subscriber, the SSP uses the appropriate messaging process in a query/response exchange to obtain the calling party name and/or other information from the appropriate network element that includes the calling party name (and/or other information) in or has access to an appropriate location register. The SSP then delivers the calling party name (and/or other information) over the calling line for display on the called party's wireline unit or other display device. Advantageously, the subscriber to calling name delivery service who is using a wireline unit is provided with the service with respect to wireless units as well as wireline units.

More specifically stated, the present inventions relate to an exemplary method to provide a wireline unit with information corresponding to a wireless unit when the wireless unit makes a call to the wireline unit. This method may be implemented in an environment of a communications system including a wireless network and a wireline network. The wireless network includes a network element functionally connected to the wireline network. The network element also is functionally connected to a location register (LR) with the LR including at least an entry corresponding to a wireless unit. The entry includes a mobile identification number (MIN) and/or a mobile directory number (MDN) of the wireless unit. The wireline network includes a service switching point (SSP) serving a wireline unit. Pursuant to this exemplary method, the MIN and/or the MDN in the entry in the LR are associated with information corresponding to the wireless unit.

When the wireless unit calls the wireline unit, the SSP serving the wireline unit notes that the wireline unit is to be provided with calling name delivery service. The SSP initiates a query/response exchange with a network element in the wireless network so as to obtain information, such as the calling party name, regarding the wireless unit. In particular, the SSP routes a query to the network element in the wireless network based on the MIN and/or MDN of the wireless unit. The query is routed through the communications system until it arrives at the appropriate network element.

In response to receipt of the query by the network element, the network element uses the MIN and/or the MDN with the LR to find the entry in the LR including the MIN and/or the MDN. Based on the information associated with the MIN and/or MDN in the entry, the LR retrieves the information corresponding to the wireless unit and provides the information to the network element. The network element then provides the information in a response routed through the communications system to the SSP. Upon receipt of the response, the SSP provides the information to the wireline unit. Upon receipt of the information, the wireline unit may display the information to the called party. Advantageously, the called party may be provided with the calling party name of the person using the wireless unit to call the called party.

The present inventions also provide an exemplary LR for use in a network element of a wireless network. The LR typically includes a plurality of entries with each entry including a MIN and/or MDN corresponding respectively to a wireless unit. Each MIN and/or MDN of an entry is associated with information, such as calling party name information, corresponding respectively to the wireless unit. The information is retrievable based on the MIN and/or MDN of the wireless unit for provision in response to a query for the information received by the network element of the wireless network. Advantageously, the LR allows for information corresponding to a wireless unit to be retrieved from the LR through use of an entry having the MIN and/or the MDN in common with the wireless unit.

In the exemplary LR, the information associated with the MIN and/or MDN of an entry may include a name, and a presentation indicator associated with a name. Further, the information may include a calling name subsystem number or a calling name translation type.

Further, the present inventions relate to an exemplary method for an LR of a network element in a wireless network to provide information associated with a wireless unit. Pursuant to this method, the LR is provisioned to include a plurality of entries with each entry including a MIN and/or MDN and corresponding respectively to a wireless unit. Each MIN and/or MDN of an entry is associated with information corresponding respectively to the wireless unit.

The LR may receive a query for information related to a wireless unit. For example, the query may seek the calling party name associated with the wireless unit. In response to receipt of a query including the MIN and/or the MDN, the LR uses the MIN and/or the MDN to find an entry having the MIN and/or the MDN in common with the query. The LR may check whether the information associated with the MIN and/or the MDN includes a presentation allowance or other such indicator. Based on the information being associated with the MIN and/or the MDN of the entry, the LR retrieves the information corresponding to the wireless unit. The LR then provides the information in a response to the query. In an exemplary embodiment, prior to providing the information, the LR may check that a presentation indicator including a presentation allowance is present in the information. In some cases, the information may include a presentation indicator that includes a presentation restriction. If a presentation restriction is included in the information, the LR may provide a response to the query, but the response may include notice of the presentation restriction and fail to include the information sought by the query.

Therefore, it is an object of the present inventions to provide methods and systems that provide a calling party name and/or other information to a wireline unit where the wireless unit used to make a call to the wireline unit of a subscriber having a calling name delivery service.

DETAILED DESCRIPTION

Generally stated, the present inventions relate to methods and systems that provide a calling party name and/or other information associated with a wireless unit to a wireline unit of a subscriber having a calling name delivery service.

An exemplary embodiment implements the present inventions by providing for a calling party name and/or other information associated with a wireless unit to be stored in association with the mobile identity number (MIN) and/or mobile directory number (MDN) in a location register (LR) such as the home location register (HLR) in or functionally connected to a network element (such as a service control point (SCP)) in a wireless network of a communications system.

When a calling party uses a wireless unit to make a call to a wireline unit of a subscriber having a calling name delivery service in a wireline network, the call is routed in a conventional manner from the wireless network to the wireline network, and in particular, to the service switching point (SSP) serving the calling line of the wireline unit. Based on the called party's status as a subscriber to calling name delivery service (e.g., the called party's line is enabled for the service), the SSP obtains the calling party name and/or other information in a query/response exchange with the appropriate network element that includes the calling name (and/or other information) in or has access to an appropriate location register (LR). Advantageously, the SSP may provide the calling party name and/or other information for display on the called party's wireline unit or display device.

Figure 1:
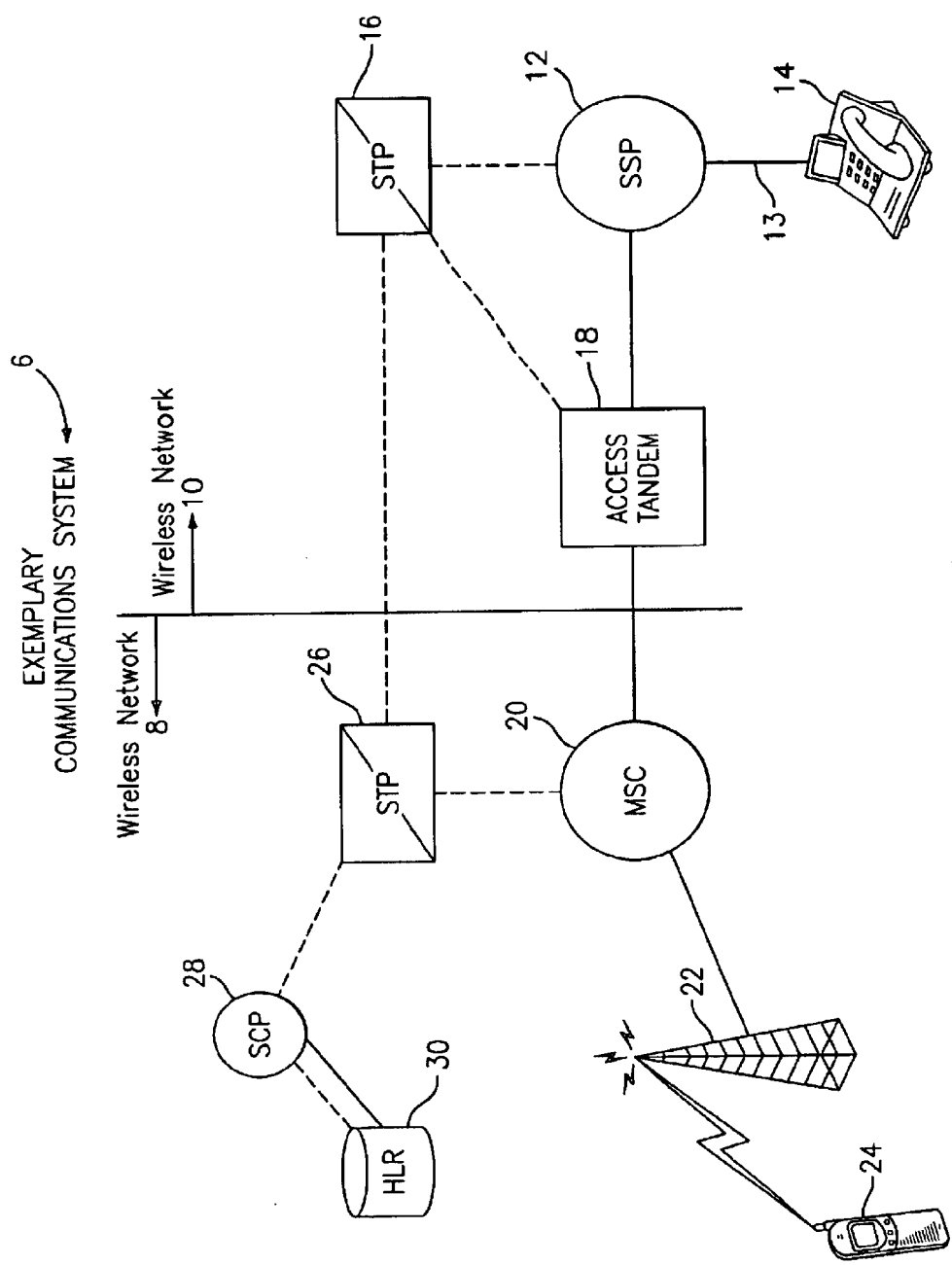
FIG. 1 illustrates an exemplary environment for implementation and/or operation of exemplary embodiments of the present inventions.
Figure 2:
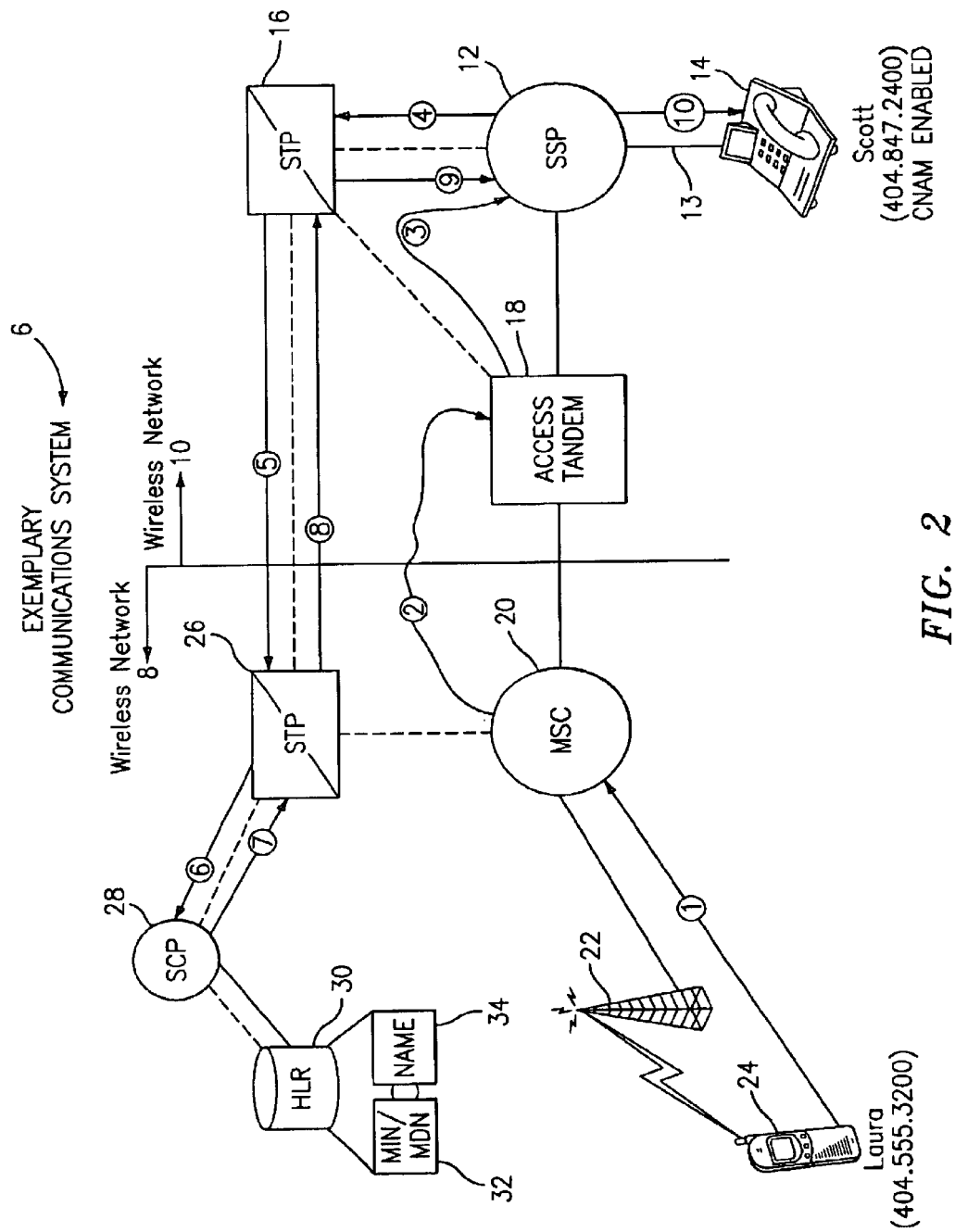
FIG. 2 illustrates an exemplary method of the present inventions.

Additional details regarding the present inventions are provided below beginning with a description of an exemplary environment (FIG. 1), a description of the provisioning of an exemplary HLR of an exemplary network element in a wireless network, and a description of call flow in a call from a wireless unit to a wireline unit of a subscriber having calling name delivery service (FIG. 2).

Exemplary Environment—FIG. 1

FIG. 1 illustrates an exemplary environment of a communications system 6 for implementation and/or operation of exemplary embodiments of the present inventions. Communications system 6 includes a wireless network 8 and a wireline network 10. The wireline network 10 may be the public switched telecommunications network (PSTN) or the like. A wireline network also may be referred to as a landline network. The wireline network 10 includes a plurality of end offices which are represented by service switching point (SSP or switch) 12. An SSP typically includes switch functionality, but also includes other functionality so as to communicate with other network elements, and in particular, with Advanced Intelligent Network (AIN) elements.

An SSP is coupled to one or more subscriber lines, which also may be referred to as calling lines or telephone lines. Each SSP serves a designated group of calling lines, and thus, the SSP that serves a particular calling line may be referred to as its serving switch. A representative calling line 13 is illustrated as being served by SSP 12. Each calling line is assigned a ten digit calling line number, which also may be referred to as a telephone number or directory number. For example, a calling line number may be in the form of "NPA-NXX-XXXX."The calling line 13 is typically connected to a piece of terminating equipment such as a telephone 14. Although a telephone is illustrated as the terminating equipment, terminating equipment may include other telecommunications devices including, but not limited to facsimile machines, computers, modems, etc. Thus, to reach a particular subscriber associated with the telephone 14, a caller dials the telephone number assigned to the calling line connected to the telephone 14. The call is routed from the caller through the communications system 6, and in particular, through the wireline network 10 until the call arrives at the SSP 12 serving the calling line 13 connected to the telephone 14.

SSP 12 is interconnected to other SSPs by a plurality of trunk circuits (not illustrated). These are the voice path trunks that interconnect the SSPs to connect communications. The solid lines (other than arrows) connecting the elements in the figures represent voice links. Each of the SSPs is connected to another type of AIN element referred to as a local signal transfer point (STP) 16 via respective data links. The dashed lines connecting the elements in the figures represent data links. Currently, these data links employ a signaling protocol referred to as Signaling System 7 (SS7). Much of the intelligence of the AIN resides in yet another type of element referred to as a service control point (SCP) (not illustrated) that may be connected to STP 16 and other elements (not illustrated) over SS7 data links.

As noted, the communications system 6 illustrated in FIG. 1 includes a wireless network 8 and a wireline network 10. The wireless network 8 may be a cellular system, a personal communications service (PCS) system, a global standard for mobile communications (GSM) system, a wireless intelligent network (WIN), or other system wherein radio technology is used in communications. A device operating in the wireless network 8 may be referred to as a wireless unit, a wireless communications unit (WCU), a mobile phone, a cell phone, a car phone, or the like. Generally, the exemplary wireless network 8 and the devices operating therein operate pursuant to a standard entitled "Cellular Radio-Telecommunications Intersystem Operation", established by the Telecommunications Industry Association (TIA), 2500 Wilson Boulevard, Arlington, Va. 22201. This standard is commonly referred to as ANSI-41. See also ANSI-41D, American National Standards Institute, New York, N.Y., and TIA/EIA-41D, Cellular Radiotelecommunications Intersystem Operations, December 1997, and TIA/EIA-41-D Enhancements for Wireless Calling Name Feature Descriptions, June 1998, Telecommunications Industry Association (TIA)/Electronic Industries Association (EIA), Standards & Technology Department, 2500 Wilson Boulevard, Arlington, Va. 22201, which are incorporated herein by reference.

The wireless network 8 may be functionally connected to the wireline network 10 in a number of ways. FIG. 1 illustrates a connection between the wireless network 8 and the wireline network 10 through an access tandem 18. This type of connection through the access tandem 18 generally carries voice traffic between the wireless network 8 and the wireline network 10. In addition to connecting wireless and wireline networks, access tandems may be used to connect other elements of a communications system such as two SSPs of a wireline network. Further, an access tandem 18 may be connected to elements of the wireless network 8 or wireline network 10 through data links as illustrated in FIG. 1 by the data link between STP 16 in the wireline network 10 and the access tandem 18.

As illustrated, the access tandem 18 is connected to a mobile switching center (MSC) 20 (also referred to as a mobile switch). An MSC in the wireless network 8 may be likened to a switch in the wireline network 10 in that an MSC directs communications to and from wireless units served by the MSC. But unlike a switch in the wireline network 10, an MSC typically stores or has access to information about wireless units operating in an area or region served by the MSC. Particularly, an MSC generally includes or has access to two location registers (not illustrated) for the storage of information about wireless units. A home location register (HLR) (not illustrated) includes entries for wireless units that are considered to be "home" units to the MSC. A visitors' location register (VLR) (not illustrated) includes entries for wireless units that are "roaming" in the region served by the MSC. An MSC 20 typically is connected by wireline to one or more base stations such as station 22. A base station 22 uses radio technology to send and to receive communications to and from wireless units operating within the range of the base station 22.

FIG. 1 illustrates a cell phone 24 as the wireless unit operating in the wireless network 8, but a wireless unit may include other devices operating based on radio technology in communications.

The wireless network 8 in FIG. 1 also includes an STP 26 that is connected to other elements of the communications system 6. As illustrated, STP 26 is connected by respective data links to the MSC 20 in the wireless network 8, to the STP 16 in the wireline network 10, and to a service control point (SCP) 28 in the wireless network 8. As discussed briefly above in connection with the SCPs that may be present in a wireline network 10, an SCP such as SCP 28 in the wireless network 8 is generally an intelligent network element. Typically, an SCP includes service package applications (SPAs), programming, and/or the like for the implementation of communications and other services to subscribers. An SCP also may include and/or have access to databases, tables, or other storage for information related to subscribers, and particularly, information that may be helpful in the implementation of communications and other services to subscribers.

FIG. 1 illustrates that SCP 28 is at least functionally connected to location register (LR), and specifically, to a home location register (HLR) 30. Although HLR 30 is illustrated as separate from SCP 28, HLR 30 may be included as part of SCP 28. Alternatively, or in addition, HLR 30 may be a separate unit or may be included as part of another network element such as MSC 20. Further, HLR 30 may be connected to SCP 28 by line connection and/or by data links. In this exemplary embodiment, the HLR 30 includes entries for wireless units that are considered to be "home" units to MSC 20. The cell phone 24 is a wireless unit that is a "home" unit of MSC 20. Thus, HLR 30 includes an entry for cell phone 24. But the HLR 30 also may include entries for wireless units (not illustrated) that are considered to be "home" units to other MSCs (not illustrated) in the wireless network 8. Additional details regarding the information stored in the entries of HLR 30 are provided below.

Provisioning of an Exemplary LR

An exemplary embodiment of the present inventions provides for the storage of or access to calling name and/or other information related to a person/entity associated with a wireless unit in or by a location register (LR) such as the home location register (HLR) of a network element in a wireless network. FIG. 1 illustrates that such an LR may be the HLR 30 that is functionally connected to the network element referenced as SCP 28. The LR may be another register, database, table, or the like that may include the information described below in connection, correspondence, or association with an exemplary entry. The network element generally may be any intelligent network element (such as the SCP 28 or an intelligent peripheral) that is at least functionally connected to the LR and that is provisioned as described below in connection with the exemplary SCP 28 or provisioned equivalently.

The calling name and/or other information related to the person/entity associated with the wireless unit may be stored in or accessed by the HLR in an entry, in a calling name table, or database, or in other ways, such that the calling name and/or other information may be retrieved by using the mobile identity number (MIN) and/or mobile directory number (MDN) of the wireless unit. For example, the calling name associated with the wireless unit 24 may be stored in the HLR 30 in association with the MIN and/or MDN of the wireless unit 24.

Advantageously, the calling party name and/or other information for a particular wireless unit may be provisioned into or updated at the same time the MIN and/or MDN of the wireless unit is set up or updated in the LR. Another advantage is that a separate calling name database for wireless units is not required and the problems associated with such a separate calling name database are obviated.

As well as storing the calling name and/or other information in the HLR or otherwise, the network element (illustrated as the SCP 28) is configured so as to be accessible and responsive to queries, inquiries, requests or the like for the calling name and/or other information from other elements of the communications system 6, and in particular, from elements (such as the SSPs) of the wireline network 10. For example, the network element such as SCP 28 may be configured to accept a query including the MIN and/or MDN of the wireless unit 24 originating from SSP 12 in the wireline network 10, and in response to the query, to provide a response that includes a calling name and/or other information retrieved from or through the HLR 30 on the basis or use of the MIN and/or MDN provided in the query.

An exemplary embodiment provides network elements such as the SCP 28, and the functionally connected HLR 30 to store the calling name and/or other information, to be accessible, and to respond to queries, inquiries, requests and the like for the calling name and/or other information by providing the SCP 28 with programming (such as a service package application (SPA) or the like) so as to recognize and support TR-1188, WIN, or the like message processing. TR-1188 message processing refers to the Technical Reference, TR-NWT-001188, Issue 1, December 1991, LSSGR, LATA Switching System Generic Requirements, CLASS Feature: Calling Name Delivery Generic Requirements, FSD 01-02-1070, Bell Communications Research, Inc. (BellCore), Morristown, N.J., which is incorporated herein by reference.

As those skilled in the art recognize, TR-1188 message processing is used in the provision of calling name delivery service in wireline networks. Advantageously, the configuration of a network element in a wireless network to recognize and support TR-1188 message processing allows wireline network elements such as an SSP to conduct a query/response exchange for calling name information with a wireless network element such as the SCP 28.

By way of additional explanation, an exemplary call flow is provided immediately below in connection with FIG. 2 with respect to the display on a wireline unit of a calling name associated with a wireless unit used to make a call to the wireline unit.

An Exemplary Call Flow—FIG. 2

FIG. 2 illustrates an exemplary method of the present inventions. Assume for this exemplary method that a customer (Scott) of the service provider for the wireline network 10 subscribes to a calling name delivery service. Scott's wireline unit 14 is connected by calling line 13 and is served by SSP 12. Scott's calling line 13 has been assigned the directory number of 404.847.2400. As Scott is a subscriber to calling name delivery service, Scott's calling line 13 is enabled for that service. Such enablement may be accomplished in any manner of different ways. For example, Scott's serving SSP 12 may include line information for Scott's calling line 13 that enables Scott's calling line 13 for calling name delivery service. As another example, Scott's calling line may be provisioned with a terminating attempt trigger (TAT) such that the serving SSP 12 obtains instructions from another wireline network element (such as an SCP or an intelligent peripheral (not illustrated)) on how to handle a call for Scott's calling line 13.

Also assume for this example that a customer (Laura) of the service provider for the wireless network 8 uses a wireless unit 24. Upon subscription to wireless service in the wireless network 8, information regarding Laura and her wireless unit 36 is provisioned in an entry in the HLR 30 of SCP 28. The entry corresponding to Laura is typically one of a plurality of entries corresponding to other subscribers of wireless service. In particular, Laura's entry in the HLR 30 is provisioned to include at least a mobile identity number (MIN) and/or a mobile directory number (MDN) 32 for Laura's wireless unit 24.

In the exemplary embodiments, a MIN and/or MDN of an entry in the network element may be associated with information corresponding to the appropriate respective wireless unit (i.e., the wireless unit of the MIN and/or MDN). The information may include a source indicator such as a calling party name (such as the subscriber's personal name, nickname, etc.), the name of an entity, or the like, (such as the name of a business if the wireless unit is used in connection with a business), and/or other information that may be provided as an indication of the source of a call (such as geographic information). For example, the MIN and/or MDN 32 of Laura's entry may be associated with Laura's personal name.

In addition to the source indicator, the information may include an indicator ("presentation indicator") as to whether the source indicator (and/or other information) is to be provided in response to a query, inquiry, or request for such information. The presentation indicator in the information may include a presentation restriction, a presentation allowance, and/or a variable presentation option, or the like. Generally, a variable presentation option is a "toggle" option that allows the subscriber to switch back and forth between a "presentation allowance" and "presentation restricton". Typically, such a switch or toggle is implemented by a subscriber dialing a special feature code or the like. In response to receipt of the special feature code, the appropriate system or application (such as in the SCP 28 or HLR 30) arranges for the opposite presentation or restriction of what had been associated with the subscriber.

For example, assume Laura's presentation indicator is set to presentation allowance so that her name is presented to called parties when Laura makes calls using her wireless unit. Assume Laura desires to make a prank call to a friend and does not want to have the friend alerted to her identity when she makes the prank call using her wireless unit. In that case, Laura may toggle her presentation indicator from "presentation allowance" to "presentation restriction". When Laura makes her prank call, her name then is not presented to the called party. Of course, there are more serious and more practical uses for the variable presentation option. For example, a physician calling a patient at the patient's place of employment may toggle the indicator to "presentation restriction" so as to maintain patient confidentiality.

In addition to the source indicator and the presentation indicator, the information may include data ("implementation data") related to the implementation of the calling name delivery service such as a status indicator, a calling name subsystem number, a calling name translation type, or the like.

An association between the MIN and/or MDN 32 of an entry and the information corresponding to a wireless unit may be accomplished in any manner of different ways. For example, the entry including the MIN and/or the MDN may include the information as part of the entry. As another example, the entry or the MIN and/or MDN of the entry may serve as a pointer, flag, etc. or include a pointer, flag, etc. to another storage medium (such as a database, table, or the like) including the information corresponding to the wireless unit. The other storage medium may be included in the HLR 30, the SCP 28, or another network element such as an MSC 20. Preferably, the association is accomplished in such a manner that the information corresponding to the wireless unit may be retrieved based on the MIN and/or MDN of the wireless unit.

As noted, the information corresponding to the wireless unit and associated with the MIN and/or MDN in an entry of the HLR may include a presentation indicator such as a presentation restriction, a presentation allowance, and/or a variable presentation option, or the like. By inclusion of such a presentation indicator in the information, the HLR 30 is effectively provisioned so that the MIN and/or MDN for Laura's wireless unit 24 is associated with a presentation allowance or presentation restriction related respectively to Laura's desire or lack thereof to have her source indicator (such as her personal name) presented or not presented to called parties. Assume for this example that the presentation indicator is a presentation allowance, i.e., Laura's information may be presented to a called party when Laura uses her cell phone to make a call to the called party.

Referring again to the example illustrated in FIG. 2, assume that Laura has initiated a call from her wireless unit 24 to Scott's home telephone 14 by dialing Scott's directory number (404.847.2400). Laura's call is routed in a conventional manner from her wireless unit 24 through base station 22 to the MSC 20 serving Scott's unit (arrow 1). The MSC 20 further routes the call on the basis of the dialed directory number to access tandem 18 (arrow 2), which routes the call to the SSP 12 serving Scott's calling line (arrow 3). As noted, Laura's call is routed in a conventional manner in the communications system 6 from the wireless network 8 to the wireline network 10, and so the routing includes use of the Initial Address Message (IAM) in the Integrated Services Digital Network User Part (ISUP) of the SS7 protocol. The IAM includes at least Laura's MIN and/or MDN, and may include a point code or other identifier for the MSC 20 serving Laura's wireless unit 24.

At the SSP 12, Scott's calling line is enabled for calling name delivery service. Thus, in response to Laura's call to Scott, the SSP 12 launches a query for the information that is associated with the MIN and/or MDN of Laura's cell phone. In this example, the MIN and MDN of Laura's cell phone is 404.555.3200.

Preferably, the query is a TR-1188[5] residential name query as explained above, and in particular, a TR-1188 TCAP INVOKE message for calling name (CNAM). The TCAP aspect of the query includes a GenericName (GN) parameter and a Digits parameter. The GN parameter is empty of content, but the Digits parameter contains the MIN and/or the MDN of Laura's wireless unit 24.

The query is routed initially to STP 16 in the wireline network (arrow 4). The STP 16 performs a global title translation (GTT) on the MIN and/or MDN in the query to obtain the point code of the network element to which the query is to be ultimately routed. Thus, the STP 16 is provisioned with or has access to information such as a table, database, chart, application, or the like which the STP 16 may use in connection with the MIN and/or MDN provided by the query to obtain the point code of the network element to which the query is to be ultimately routed. In this example, the GTT results in a point code for the network element 28 in the wireless network 8. After the STP 16 performs the GTT, the query is routed in a conventional manner through the communications system 6 until it reaches the STP 26 in the wireless network 8 serving the network element to which the query is to be routed (arrow 5). The STP 26 further routes the query to the SCP 28, and hence, to the HLR 30 (arrow 6).

Generally stated, upon receipt of the query, the SCP 28 checks with the HLR 30 for an entry or a record including the MIN and/or MDN of Laura's wireless unit 24. There are four possible results to the check:

(1) The entry or record including the MIN and/or MDN is not found. In that case, a response is returned pursuant to the TR-1188 messaging process that includes a Return Error with the error code set to "missing customer record", or the like.

(2) The appropriate entry or record is found, but the associated information is unavailable for some reason. In that case, a response is returned pursuant to the TR-1188 messaging process that includes a Return Error with the error code set to "data unavailable", or the like.

(3) The appropriate entry or record is found and the associated information is available. As noted, the information may include a presentation indicator as well as a calling party name. The presentation indicator relates to the availability of the calling party name for presentation to the called party. If the presentation indicator is a presentation allowance, then the response may include the calling party name (and/or other information) in the GenericName parameter for presentation to the called party. If the presentation indicator is a presentation restriction, then the response may include a "private" message, or the like in the GenericName parameter for presentation to the called party.

(4) The query may be received as NOT for CNAM. In that case, a response is returned pursuant to the TR-1188 messaging process that includes a Return Reject with problem specifier set to "Incorrect Parameter."

Referring again to the example of Laura's call to Scott, upon subscription to wireless service in the wireless network 8, information regarding Laura and her wireless unit 24 were provisioned in the HLR 30 of SCP 28. In particular, the HLR 30 was provisioned to include the MIN and/or MDN of Laura's wireless unit 34 in association with Laura's name and a presentation indicator or status. In this example, the status is "presentation allowance".

Generally, the HLR 30 may include a calling name table with entries. Preferably, the calling name table is an extension to the home subscriber profile database in an HLR pursuant ANSI-41. Each entry may include a name (and/or other information) that is associated with a MIN and/or MDN in the HLR 30. An entry also may include or be associated with a presentation indicator. In some embodiments, the entry may include feature activation information as to whether the calling party presentation feature is available. Inclusion of a calling party name and/or other information may be included or not included in a response based on the feature activation information in the entry. Further, in some embodiments, the entry may include information as to a subsystem number and/or a translation type.

Thus, the MIN and/or MDN of a wireless unit (from the Digits parameter of the TR-1188 message) may be used to index into the calling name table of the LR to retrieve a name (or other information) (and presentation indicator) from an entry corresponding to the wireless unit.

In a response to the query, the SCP 28 includes Laura's name as obtained from the HLR 30, and in this example, as obtained from the entry corresponding to Laura's wireless unit 34 on the basis of the MIN and/or MDN of Laura's unit 34 associated with or in the calling name table included in the HLR 30. Also in this example, the SCP 28 includes the "presentation allowance" in the response. In particular, the SCP 28 causes the response to be returned as a TCAP Return Result with the GenericName (GN) parameter populated with Laura's name. The SCP 28 routes the response in a conventional manner through the communications system 6, and particularly, through STP 26 in the wireless network 8 (arrow 7), through the STP 16 in the wireline network 10 (arrow 8), and to the SSP 12 (arrow 9). Advantageously, the SSP 12 has obtained the name (and/or other information) associated with the wireless unit 34 that initiated the call to a calling line served by the SSP 12. The SSP 12 then transmits Laura's name (and/or other information) over calling line 13 for display on Scott's home telephone 14 (arrow 13). Scott is provided with Laura's name (and/or other information relating to the wireless unit 34) as part of the calling name delivery service to which Scott subscribed.

Alternative Exemplary Embodiments

As noted in the example discussed in connection with FIG. 2 above, Laura's call on her wireless unit 24 is through the communications system 6 to the SSP 12 serving the calling party 14. In the example discussed above, based on the called party being a subscriber to calling name delivery service, the SSP 12 then engages in a query/response exchange with a network element 28 of the wireless network 8 so as to obtain the calling name and/or other information regarding the calling party using the wireless unit.

But in at least a couple of exemplary embodiments, the need for the SSP 12 serving the called party to obtain the calling party name and/or other information is obviated by the supply of such calling party name and/or other information to the SSP 12. In an exemplary embodiment, the MSC 20 may include a location register (LR) that includes profile information as well as sub-profile information such as the calling party name and/or other information associated with the MIN and/or MDN of Laura's wireless unit 24. For example, the MSC 20 may include an entry in a register wherein the entry corresponds to the MIN and/or MDN of Laura's unit 24 and is associated with Laura's name and a presentation indicator that is set to presentation allowance (or other setting). Upon receipt of the call from Laura's wireless unit 24, the MSC 20 obtains the calling party name and/or other information from the entry. In this exemplary embodiment, the MSC 20 may include the information (Laura's name and the presentation allowance) in the set up and routing of the call to the SSP 12 serving the called party 14.

In another exemplary embodiment, the MSC 20 may not include the calling party name and/or other information, but the MSC may obtain such information as part of the set up of the call to the wireline network 10. In particular, the MSC 20 may obtain the calling party name and/or other information associated with the MIN and/or MDN of Laura's wireless unit 24 from another network element or other source. For example, the MSC 20 may obtain the information from another wireless network element such as the HLR 30 of the SCP 28. Laura's entry in the HLR 30 may include sub-profile information such as calling party name and/or other information. Also in this exemplary embodiment, the MSC 20 may include the information (Laura's name and the presentation allowance) in the set up and routing of the call to the SSP 12 serving the called party 14.

CONCLUSION

In sum, the present inventions include the described exemplary methods and systems for providing a calling party name and/or other information corresponding to a wireless unit to be stored in association with the mobile identity number (MIN) and/or mobile directory number (MDN) of the wireless unit in a location register such as the home location register (HLR) in a network element of ga wireless network. The network element is configured to accept and support the TR-1188, wireless intelligent network (WIN), or the like messaging processes. When a calling party uses a wireless unit to make a call to a wireline unit of a subscriber having calling name delivery service, the call is routed in a conventional manner to the service switching point (SSP) serving the calling line of the wireline unit. Based on the called party's status as a subscriber, the SSP uses the appropriate messaging process in a query/response exchange to obtain the calling party name and/or other information from the appropriate network element that includes the calling name (or other information) in or has access to an appropriate location register. The SSP then may provide the calling party name and/or other information for display on the wireline unit or associated display device.

From the foregoing description of exemplary embodiments, other alternative constructions of the present inventions may suggest themselves to those skilled in the art. Therefore, the scope of the present invention is to be limited only to the claims below and the equivalents thereof.

I claim:

1. A location register (LR) in a network element of a wireless network, the LR comprising:

a plurality of entries with each entry including a mobile identity number (MIN) and/or a mobile directory number (MDN) corresponding respectively to a wireless unit;

each MIN and/or MDN of an entry being associated with information corresponding respectively to the wireless unit; and the information being retrievable respectively based on the MIN and/or MDN of the wireless unit for provision in response to a query for the information received by the network element of the wireless network, whereby the information corresponding respectively to the wireless unit having the MIN and/or the MDN may be retrieved through use of the entry having the MIN or the MDN in the LR of the network element in the wireless network.

2. The LR of claim 1, wherein the information comprises a name corresponding respectively to the wireless unit.

3. A method for a location register (LR) of a network element in a wireless network to provide information associated with a wireless unit, the method comprising:

A. causing the LR to include a plurality of entries with each entry including a mobile identity number (MIN) and/or a mobile directory number (MDN) and corresponding respectively to a wireless unit, each MIN and/or MDN of an entry being associated with information corresponding respectively to the wireless unit;

B. causing the LR in response to receipt of a query including the MIN and/or the MDN to use the MIN and/or the MDN to find an entry having the MIN and/or the MDN in common with the query;

C. based on the information being associated with the MIN and/or the MDN of the entry, causing the LR to retrieve the information corresponding to the wireless unit; and D. causing the LR to provide the information in a response to the query.

4. The method of claim 3, wherein the information comprises a name corresponding respectively to the wireless unit.

5. A register in a wireless network, the register comprising:
- at least an entry including a number corresponding to a wireless unit;
- the number of the entry being associated with information corresponding to the wireless unit; and
- the information corresponding to the wireless unit being retrievable based on the number corresponding to the wireless unit,
- whereby the information corresponding to the wireless unit may be retrieved through use of the number corresponding to the wireless unit in response to a query from a network element of a wireline network.

6. The register of claim 5, wherein the number corresponding to the wireless unit comprises a mobile identification number (MIN).

7. The register of claim 5, wherein the number corresponding to the wireless unit comprises a mobile directory number (MDN).

8. The register of claim 5, wherein the information comprises a source indicator corresponding to the wireless unit.

9. The register of claim 5, wherein the information comprises a name corresponding to the wireless unit.

* * * * *